US007725397B2

(12) United States Patent
Deolalikar et al.

(10) Patent No.: US 7,725,397 B2
(45) Date of Patent: May 25, 2010

(54) METHOD AND SYSTEM FOR TIME-SEQUENTIAL AUTHENTICATION OF SHIPMENTS IN SUPPLY CHAINS

(75) Inventors: Vinay Deolalikar, Mountain View, CA (US); Salil Pradhan, San Jose, CA (US); Geoff Lyon, Menlo Park, CA (US); Lester Ortiz, Camuy, PR (US); Alipio Caban, Arecibo, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1439 days.

(21) Appl. No.: 11/105,064

(22) Filed: Apr. 13, 2005

(65) Prior Publication Data
US 2006/0235705 A1     Oct. 19, 2006

(51) Int. Cl.
*G06Q 10/00*    (2006.01)
(52) U.S. Cl. .......................................... 705/51; 705/28
(58) Field of Classification Search ............... 705/50–79
See application file for complete search history.

(56) References Cited

U.S. PATENT DOCUMENTS

| 6,381,696 B1* | 4/2002 | Doyle ......................... 713/156 |
| 2004/0205343 A1* | 10/2004 | Forth et al. .................. 713/168 |
| 2005/0154896 A1* | 7/2005 | Widman et al. ............. 713/182 |

OTHER PUBLICATIONS

Dr. Andrew D. Dubner—"Securing The Pharmaceutical Supply Chain—The Authenticated RFID Platform"—3M White Paper—Jun. 2005—8 pages.

* cited by examiner

*Primary Examiner*—Andrew J. Fischer
*Assistant Examiner*—Thomas West

(57) ABSTRACT

In one embodiment of the present invention, a source point, or security management entity, within a supply chain labels a shipment to be shipped through the supply chain with numbers, text strings, or other type of label information. Different label information may be placed at each of multiple levels of packaging as well as on objects within the packaging. The source point devises an encryption-key chain via a one-way function, and encrypts combinations of the label information incorporated within the packaging and objects using encryption keys from the encryption-key chain to produce one or more encrypted label tags. The one or more encrypted label tags are affixed to the shipment by the source point, and the shipment is sent into the supply chain for eventual delivery to a destination point. At pre-selected intervals of time, the source point reveals encryption keys within the encryption-key chain. In one embodiment of the present invention, revealing of encryption keys allows intermediate points or the destination point in the supply chain at which the shipment resides to extract label information and apply the most recently revealed encryption key to compute a label-tag value, and to then compare the computed label-tag value to a label tag affixed to, or incorporated within, the shipment.

13 Claims, 12 Drawing Sheets

METHOD AND SYSTEM FOR TIME-SEQUENTIAL AUTHENTICATION OF SHIPMENTS IN SUPPLY CHAINS

TECHNICAL FIELD

The present invention is related to security and authentication, and, in particular, to the authentication of physical objects shipped through supply chains.

BACKGROUND OF THE INVENTION

Security of shipped objects in supply chains has been a problem for manufacturers, shippers, distributors, and recipients of shipped goods for thousands of years. Security issues have been addressed by many different techniques, including various types of seals, such as wax seals, markings and encodings, trusted distributors and distribution agencies, trademarks, armed guards, and, more recently, mechanical and electronic devices and computer-based systems for ensuring that an object sent from a source point in a supply chain reaches a destination point intact, untampered with, undamaged, and in a timely fashion. However, as methods for securing shipment of objects have evolved, methods used by counterfeiters and thieves to defeat security methods have also evolved. As a result, theft, counterfeiting, shipment delays, and shipment-routing problems continue to plague supply chains.

One important example of supply-chain-security problems in contemporary commerce is the shipment of pharmaceuticals from pharmaceutical manufacturers to various distributors and retail outlets. FIGS. 1 and 2 illustrate a pharmaceutical-supply-chain context used, in subsequent subsections, as one context for application of the methods of the present invention. In FIG. 1, a large pharmaceutical manufacturer 102 manufacturers pharmaceuticals that are shipped, in the case of FIG. 1, by rail 104 to a number of centralized distribution facilities, such as centralized distribution facility 106. From these centralized distribution centers, smaller shipments 108 of pharmaceuticals are made to a number of regional distribution centers, including regional distribution center 110 in FIG. 1, from which the pharmaceuticals are then shipped by local transport 112 to a number of local distribution centers, including local distribution center 114 in FIG. 1. The pharmaceuticals are finally distributed, by local transport 116, to a number of retail outlets, such as the drugstore 118 shown in FIG. 1. As shown in FIG. 2, the pharmaceuticals may be initially shipped in bulk 202 from the pharmaceutical manufacturer to centralized distribution facilities. The pharmaceuticals may be packaged into bottles at the centralized distribution facilities, and shipped in large packages 204 to regional distribution centers. In the regional distribution centers, the containers may be repackaged 206 into smaller-volume packages, in which the pharmaceuticals are distributed through the supply chain to local distribution centers, from which either small packages or individual bottles 208 of the pharmaceuticals may be distributed to retail outlets. At the retail outlet, pharmaceuticals may again be repackaged into familiar prescription bottles for individual consumers.

The pharmaceutical supply chain illustrated in FIGS. 1 and 2 is but one example of a myriad possible organizations of pharmaceutical supply chains. In some cases, the pharmaceuticals may be fully packaged by the manufacturer in the packaging in which the pharmaceuticals are intended to be delivered to retail outlets. In other cases, bulk powdered or liquid pharmaceuticals may be shipped by manufacturers to secondary drug manufacturers, where they are formed into pills, gelatin capsules, glass bottles with rubber septa for loading syringes, and other final drug products, and then distributed to the supply chain. Retail outlets are but one example of a destination point in a supply chain. In the pharmaceutical-supply-chain context, for example, other destination points include clinics, hospitals, government agencies, and other health care establishments.

Drug counterfeiting has become an increasingly common and increasingly dangerous problem for pharmaceutical manufacturers, distributors, retail outlets, health-care facilities, and consumers. Drug counterfeiters seek to insert falsely labeled, counterfeit pharmaceuticals into the supply chain at various intermediate points in the supply chain in between the manufacturer, or other trusted source point, and a destination point, such as a retail outlet. By doing so, the counterfeiters can circumvent patent rights, government oversight and quality standards, and other well-designed and protective barriers to entering the pharmaceuticals marketplace. However, counterfeit drugs may be either ineffective or dangerous. Therefore, manufacturers, distributors, retailers, and consumers of pharmaceuticals have all recognized the need for improved security techniques for ensuring that the pharmaceuticals received by retail outlets, consumers, and health-care facilities are the legitimate products shipped from trusted source points in the pharmaceutical supply chain, including manufacturers, secondary drug manufacturers, centralized distributors, and other trusted points in the pharmaceutical supply chain.

SUMMARY OF THE INVENTION

In one embodiment of the present invention, a source point, or security management entity, within a supply chain labels a shipment to be shipped through the supply chain with numbers, text strings, or other type of label information. Different label information may be placed at each of multiple levels of packaging as well as on objects within the packaging. The source point devises an encryption-key chain via a one-way function, and encrypts combinations of the label information incorporated within the packaging and objects using encryption keys from the encryption-key chain to produce one or more encrypted label tags. The one or more encrypted label tags are affixed to the shipment by the source point, and the shipment is sent into the supply chain for eventual delivery to a destination point. At pre-selected intervals of time, the source point reveals encryption keys within the encryption-key chain.

In one embodiment of the present invention, revealing of encryption keys allows intermediate points or the destination point in the supply chain at which the shipment resides to extract label information and apply the most recently revealed encryption key to compute a label-tag value, and to then compare the computed label-tag value to a label tag affixed to, or incorporated within, the shipment. When the computed label-tag value is identical to the label tag affixed to, or incorporated within, the shipment, the shipment is authenticated to the lowest level of packaging or to the object from which label information was extracted by the intermediate point or destination point of the supply chain.

DETAILED DESCRIPTION OF THE INVENTION

The present invention is related to securing shipment of objects through supply chains. In described embodiments of the present invention, an encryption-based system is employed to allow the recipient of a shipment to authenticate the shipment based on information included or incorporated within the object shipped, or incorporated within or affixed to various, nested levels of packaging surrounding the object. First, basic cryptography is reviewed in the following subsection. Then, in a subsequent subsection, embodiments of the present invention are discussed.

Review of Basic Cryptography

Figure 3:
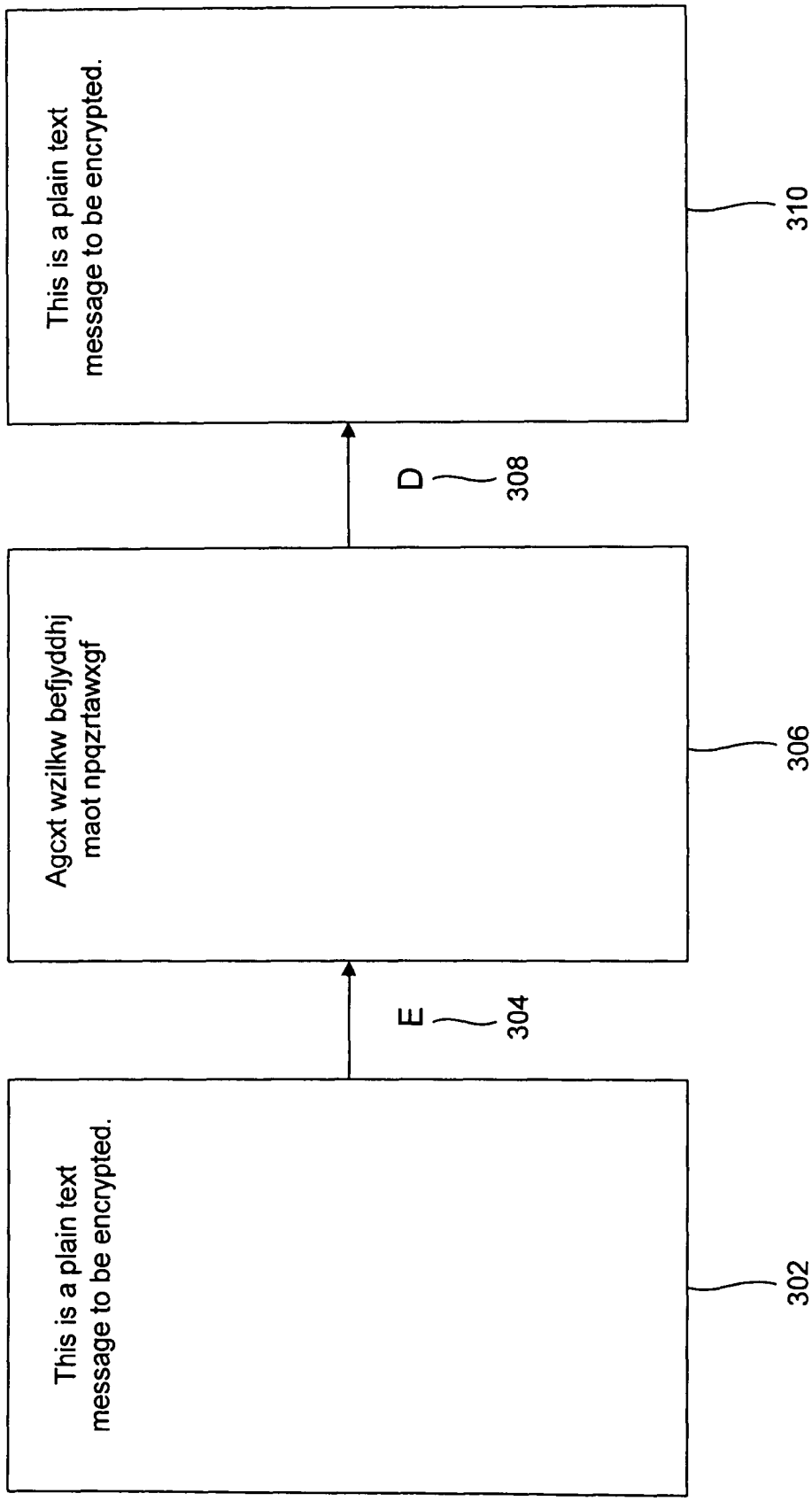
FIG. 3 illustrates a basic principle underlying cryptographic methodologies.

Certain embodiments of the present invention employ cryptographic methodologies in order to secure shipment of objects through supply chains. In this subsection, an overview of a number of basic cryptographic methods is provided. FIG. 3 illustrates a basic principle underlying cryptographic methodologies. Cryptography is designed to transform plain text information into encoded information that cannot be easily decoded by unauthorized entities. For example, FIG. 3 shows a plain text message 302 that includes an English-language sentence. This plain text message can be encrypted by any of various encryption functions E 304 into a corresponding cipher text message 306 that is not readily interpretable. An authorized user is provided with a decryption function D 308 that allows the authorized user to decrypt the cipher text message 306 back to the plain text message 310.

The basic cryptographic methods can be described using the following definitions:

$A_m$ = alphabet for messages = $\{a_{m_1}, a_{m_2}, a_{m_3} \ldots a_{m_n}\}$ $A_c$ = alphabet for cipher − text = $\{a_{c_1}, a_{c_2}, a_{c_3} \ldots a_{c_n}\}$ $M$ = message − space = strings of $a_m$ $C$ = cipher − text space = strings of $a_c$ $K$ = key space = $\{e_1, e_2, \ldots e_n\}$ where $E_{e_i}(m) \to c$ = $\{d_1, d_2, \ldots d_n\}$ where $D_{d_i}(d) \to m$ Plain text messages are instances of messages contained within the message space M and cipher text messages are instances of the cipher text messages contained within cipher-text space C. A plain text message comprises a string of one or more characters selected from a message alphabet $A_m$, while a cipher-text message comprises a string of one or more characters selected from the cipher-text alphabet $A_c$. Each encryption function E employs a key e and each decryption function D employ a key d, where the keys e and d are selected from a key space K.

A key pair is defined as follows:

key pair=$(e,d)$ where $e \in K$, $d \in K$, $D_d(E_e(m))=m$, and $m \in M$.

One key of the key pair, e, is used during encryption to encrypt a message to cipher text via an encryption function E, and the other key of the key pair, d, can be used to regenerate the plain text message from the cipher-text message via a decryption function D. In symmetric key encryption, e and d are identical. In asymmetric, public-key cryptographic methods, key pairs (e,d) have the property that, for all key pairs (e,d), no function f(e)=d can be easily determined. Thus, the encryption key e of a public-key pair (e,d) can be freely distributed, because the corresponding decryption key d of the public-key pair cannot be determined from the encryption key e.

Many cryptographic methods rely on one-way functions. A one-way function is a mathematical function or computational algorithm that allows for computation of a next value in a sequence of values, $v_i+1$ by using the current value in the sequence of values $v_i$ as an argument, or parameter, to the function or computational algorithm. However, it is mathematically and/or computationally intractable to determine, from the value $v_i+1$, the value $v_i$ from which it was produced using the one-way function. Many hash functions are examples of one-way functions. Hash functions allow a very large number of numeric or textural values to be mapped onto a smaller number of hash chains. The hash function produces a unique hash-chain value for any given number or text string, but many different numbers or text strings may be hashed to the same hash chain or hash bucket. Therefore, while the hash function reliably maps numeric or textural values to their corresponding hash chains, it is generally not possible, based on the identity of the hash chain, to deduce the numeric or textual value mapped to the hash chain by the hash function.

Figure 4:
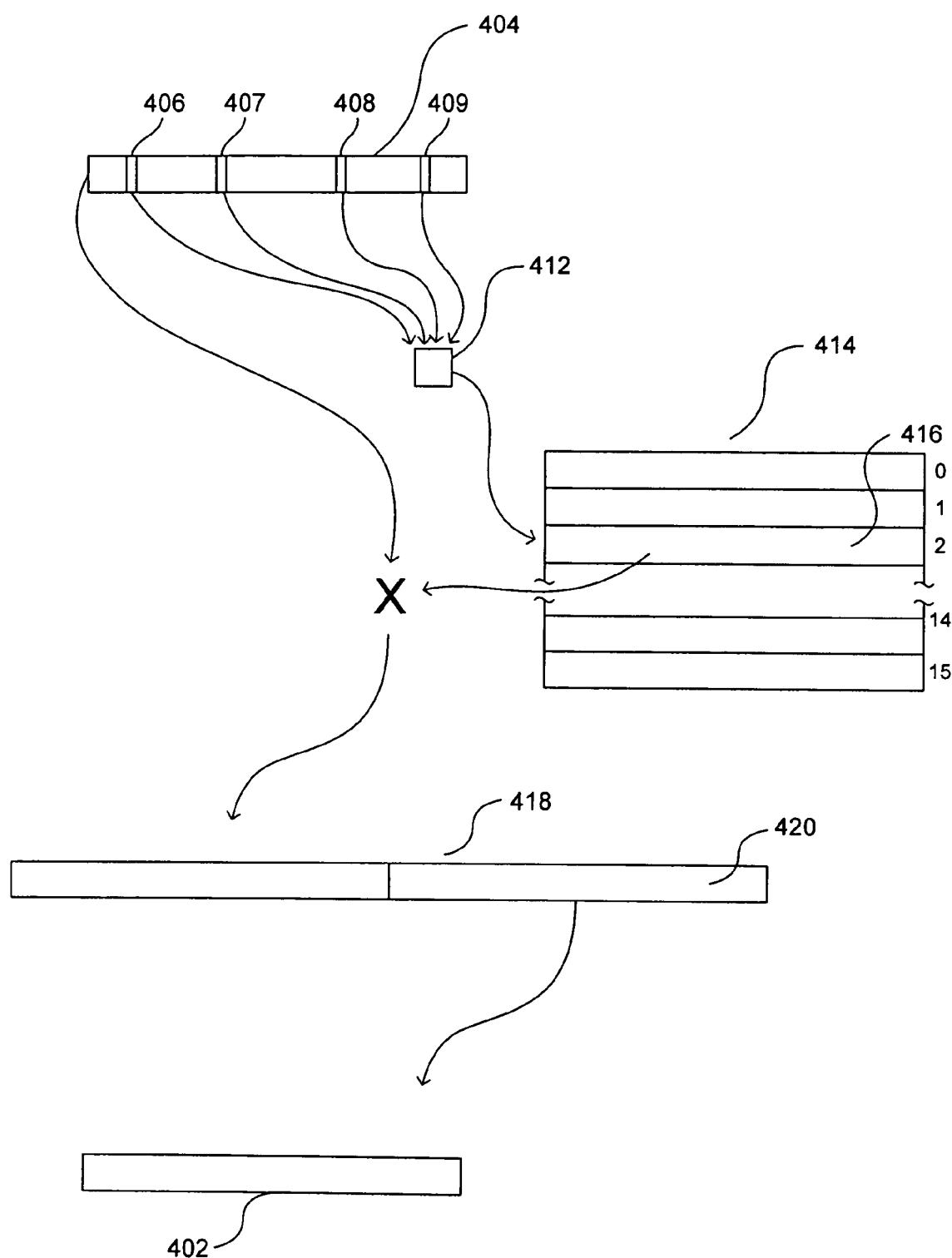
FIG. 4 illustrates one relatively simple example of a one-way function.

FIG. 4 illustrates one relatively simple example of a one-way function. In FIG. 4, the one-way function produces a next integer $n_i+1$ (402 in FIG. 4) from a current binary integer $n_i$ (404 in FIG. 4). In the exemplary one-way function, four pre-determined bits 406-409 are selected from the binary integer $n_i$ to produce a four-bit integer 412. The four-bit integer 412 is used as an index into a table of 16 large, prime numbers 414. A prime number 416 selected by the four-bit integer value 412 is then used to multiply the binary integer $n_i$ to produce a double-sized, binary integer product 418. The lower portion 420 of the double-sized, binary integer product 420 is then extracted as the succeeding value $n_i+1$ 402 produced by the one-way function. This exemplary one-way function can be implemented in a handful of assembly instructions in most computer architectures.

Figure 5:
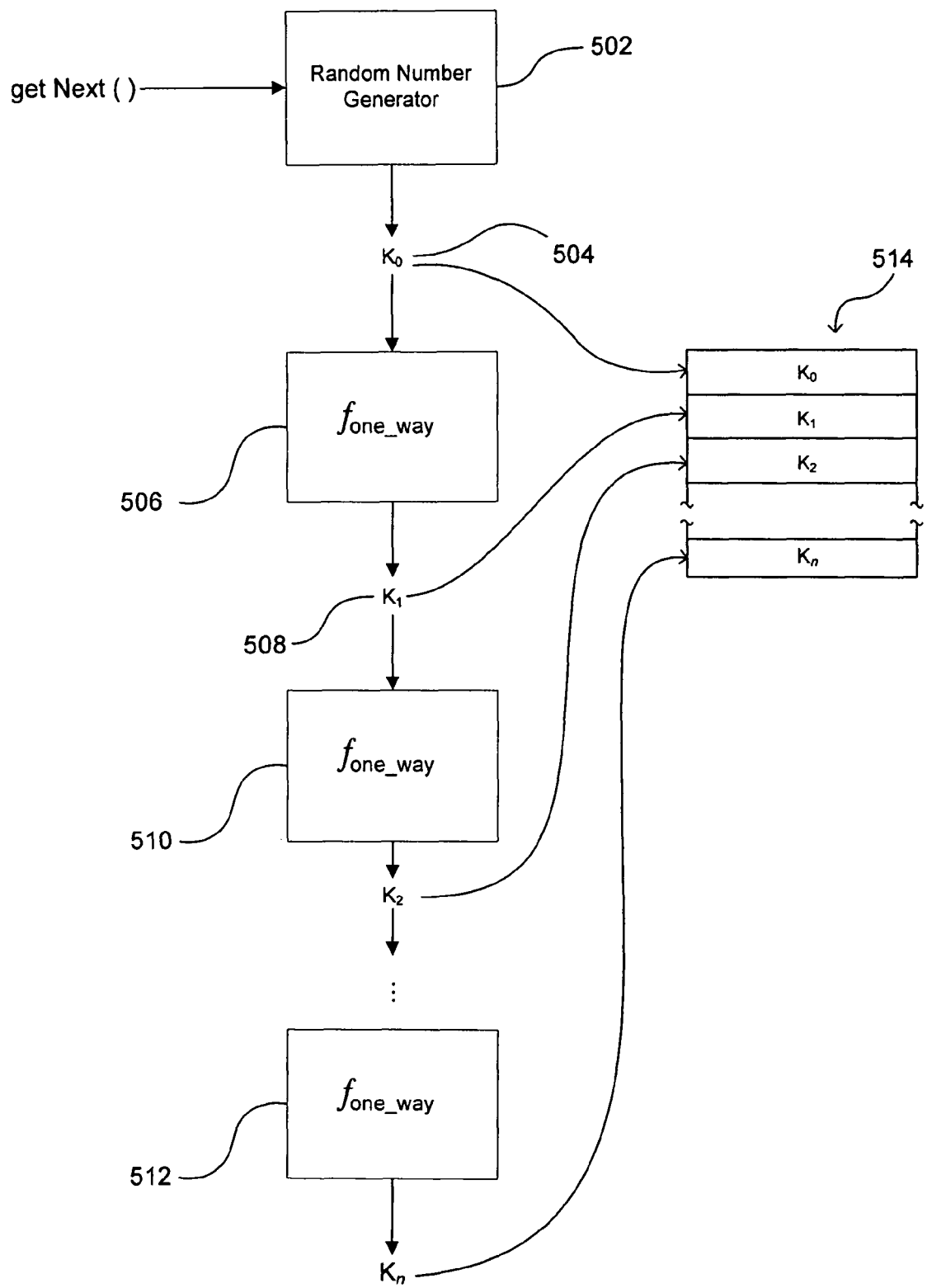
FIG. 5 illustrates computation of a series of encryption keys using a one-way function.

FIG. 5 illustrates computation of a series of encryption keys using a one-way function. A random number generator 502 can be used to generate a pseudo-random number as the first of a series of related encryption keys, $k_0$ 504. Then, a one-way function, such as the one-way function shown in FIG. 4, can be used 506 to generate a next encryption key $k_1$ 508. The one-way function can be repeatedly applied 510 and 512 n times to generate an arbitrarily sized set of successive encryption keys $k_0, k_1, \ldots, k_n$ which can be stored in an encryption-key table 514. There are many uses for chains of encryption keys in cryptography. A convenient property of such a chain of encryption keys is that, given any particular encryption key in the chain $k_i$, all succeeding encryption keys $k_{i+1}, k_{i+2}, \ldots$ can be generated using the one-way function. However, encryption keys in the chain of encryption keys preceding the given key $k_i$ cannot be determined. Various levels in a hierarchical organization of entities can therefore be furnished with varying levels of decryption capabilities by revealing different keys within a key chain, along with the one-way function used to generate them, to each of the levels.

DESCRIBED EMBODIMENTS OF THE PRESENT INVENTION

Figure 1:
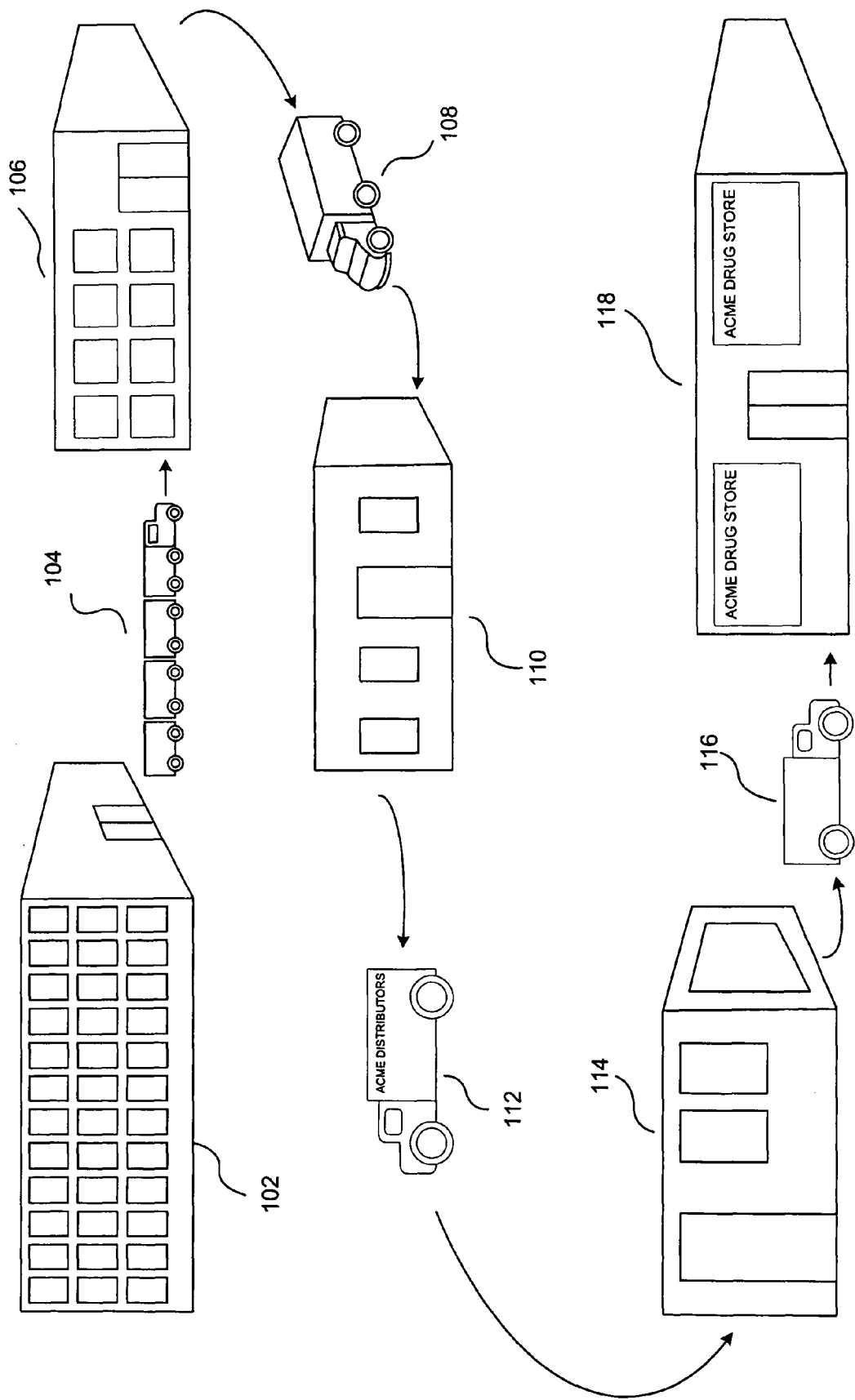
FIGS. 1 and 2 illustrate a pharmaceutical-supply-chain context used, in subsequent subsections, as one context for application of the methods of the present invention.
Figure 2:
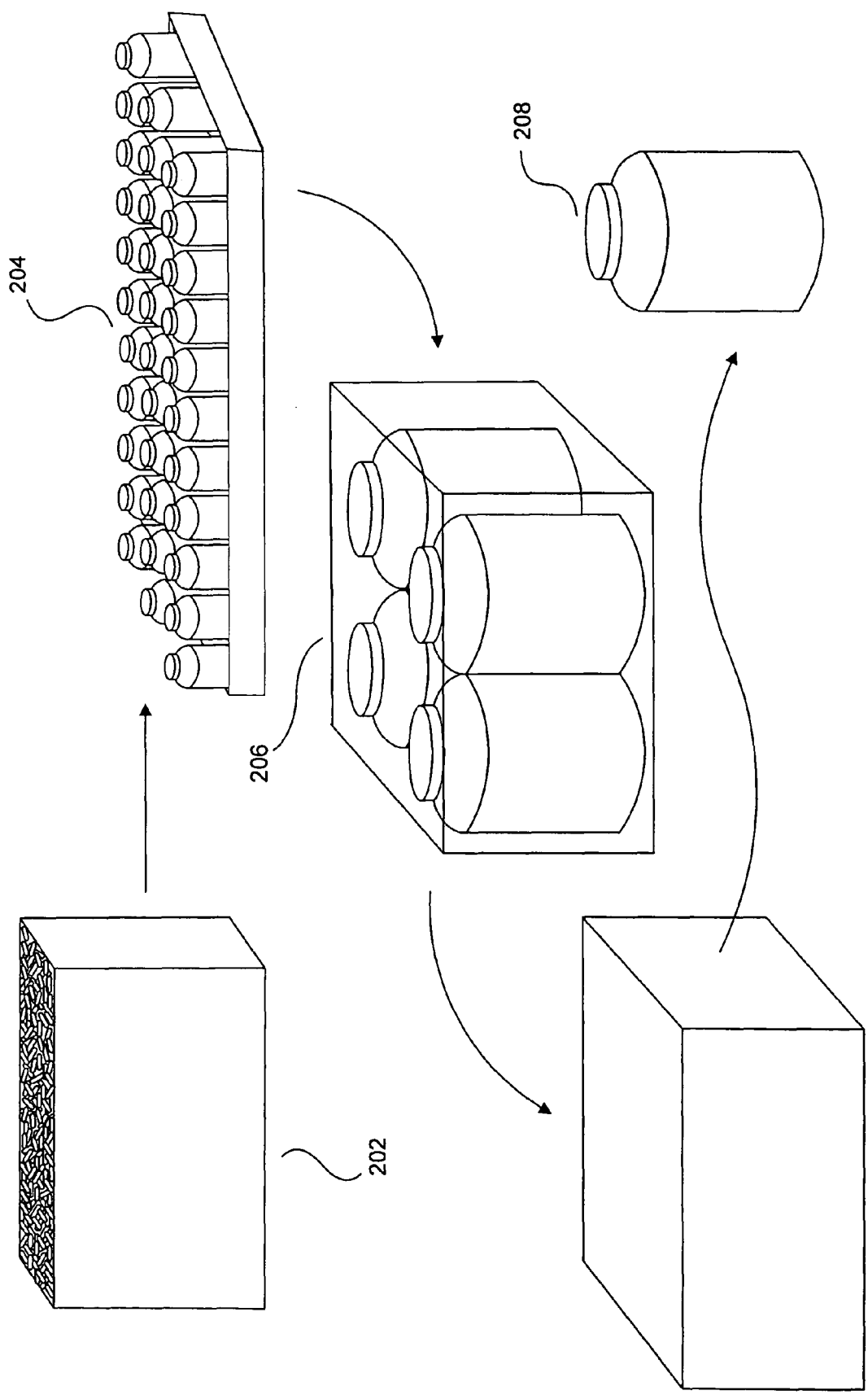

Method embodiments of the present invention employ cryptographic methods, discussed in the previous subsection, to secure shipment of objects within a supply chain. It should be noted that, although method embodiments of the present invention are described, in the current subsection, in the context of the pharmaceutical supply chain discussed above with reference to FIGS. 1 and 2, these method embodiments may be used to secure shipment of an almost limitless number of different types of objects within an almost limitless number of different types of supply chains, including shipment of electronic information in network-computer supply chains.

Figure 6:
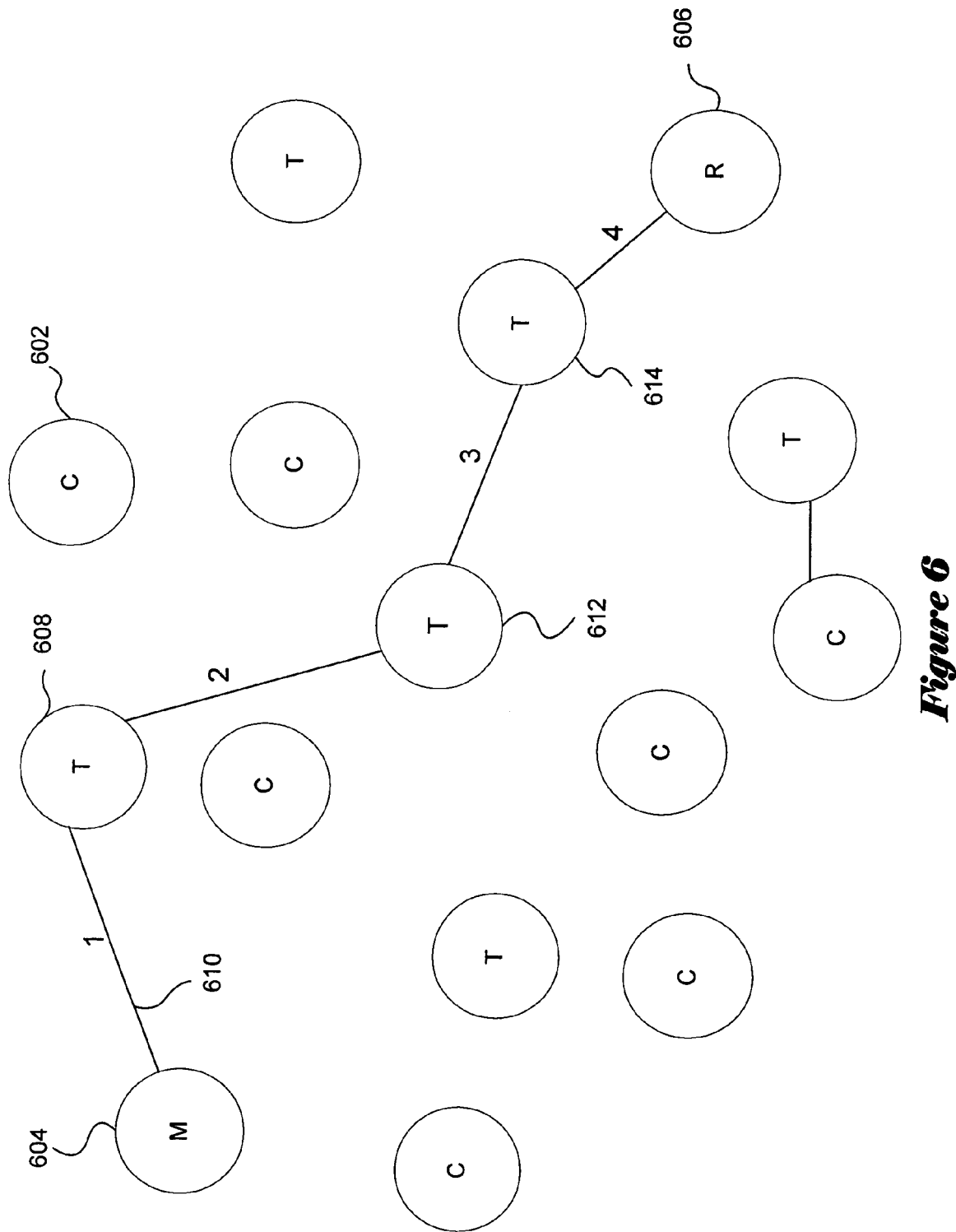
FIGS. 6-8 provide a more abstract presentation of a problem addressed by method embodiments of the present invention.
Figure 7:
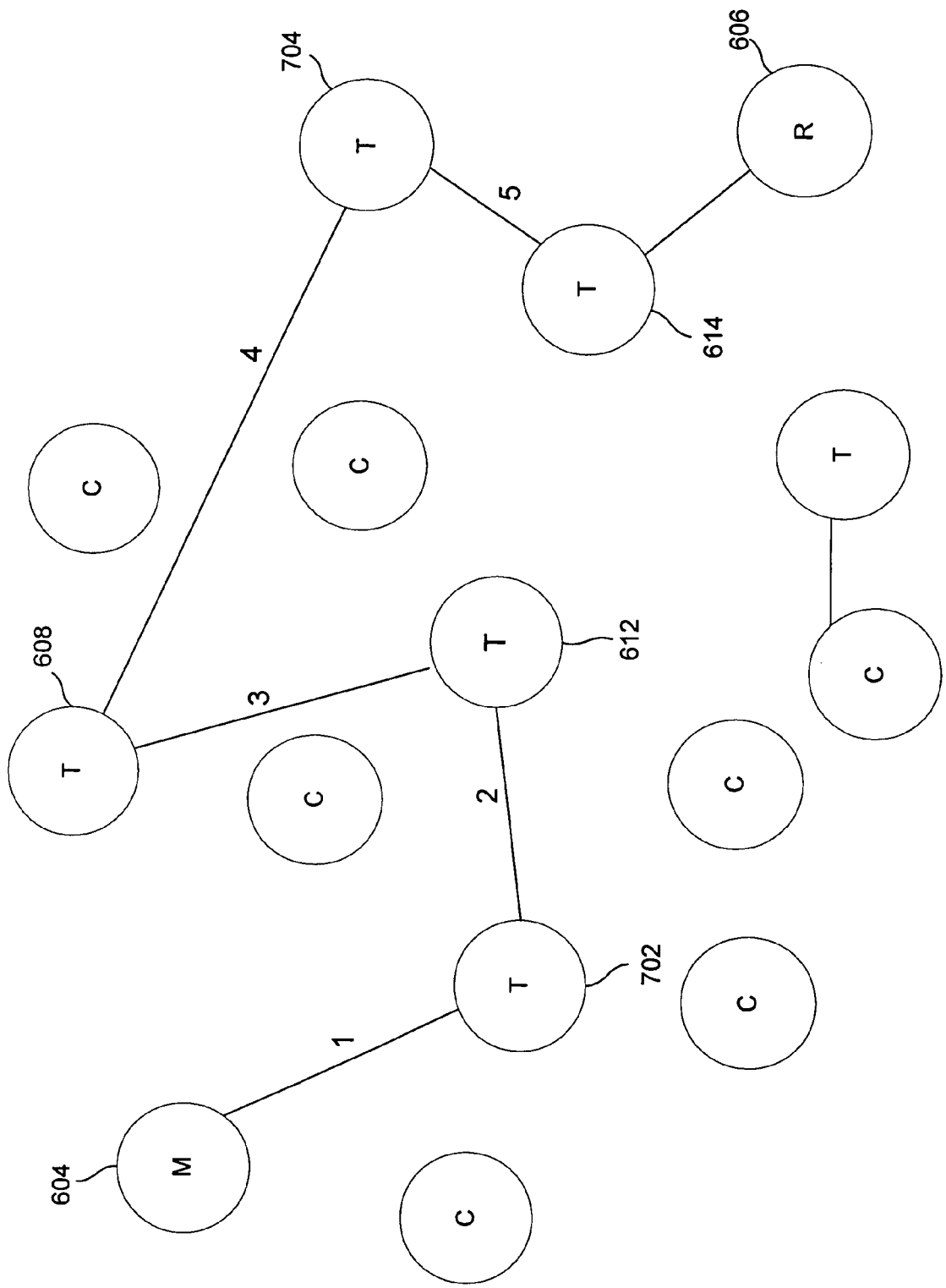
Figure 8:
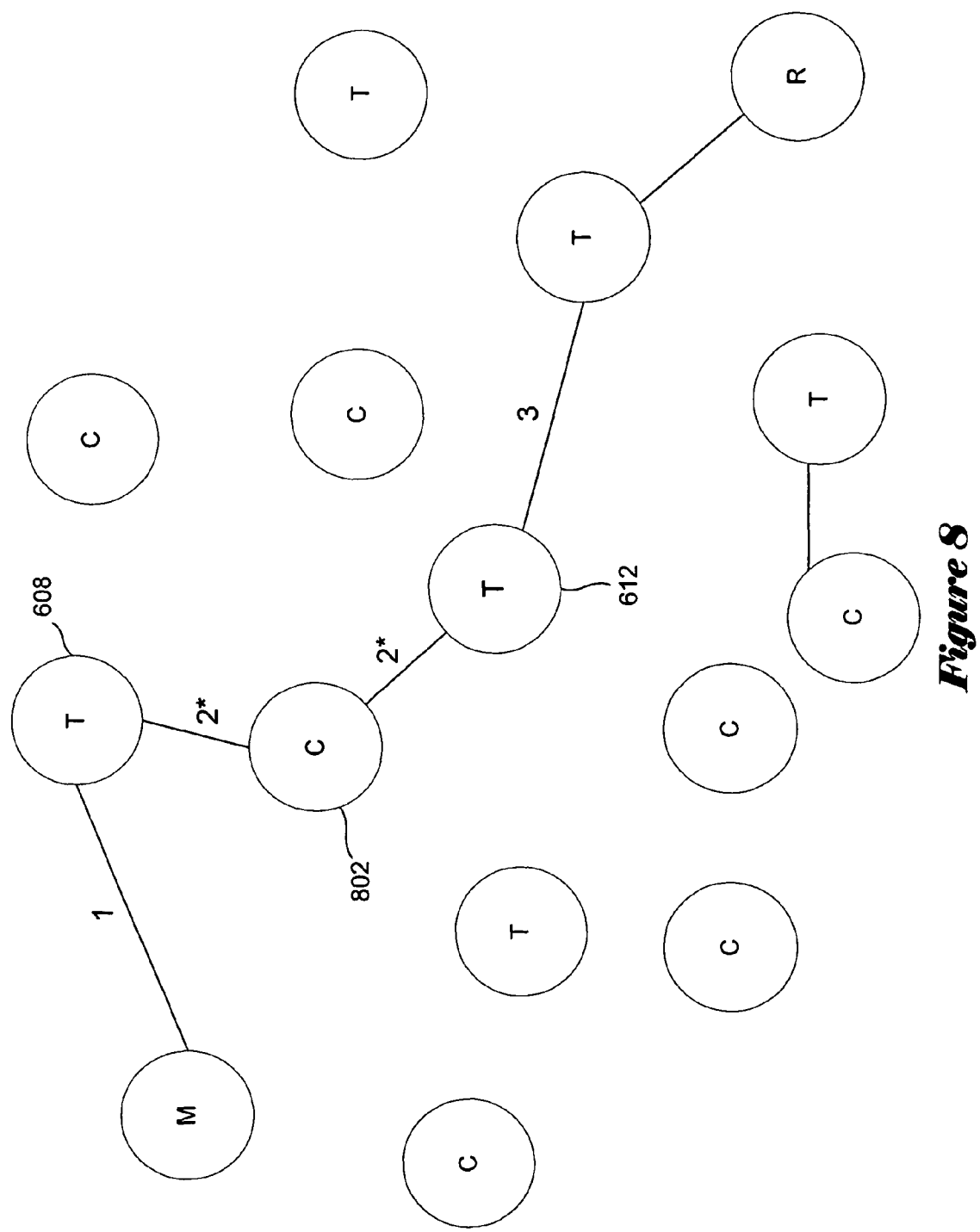

FIGS. 6-8 provide a more abstract presentation of a problem addressed by methods of the present invention. The illustration conventions used in all of FIGS. 6-8 are described with reference to FIG. 6. In FIG. 6, each circle, such as circle 602, represents a potential point in a supply chain. Circle 604, labeled "M" in FIG. 6, represents the source point for a particular shipment. In the context of the pharmaceutical supply chain illustrated in FIGS. 1 and 2, source point 604 may correspond to a pharmaceuticals manufacturer (102 in FIG. 1). Circle 606, labeled "R," is the destination point for a particular shipment. The destination point may correspond, in the pharmaceuticals context illustrated in FIGS. 1 and 2, to a retail outlet (118 in FIG. 1). Circles, such as circle 608, labeled "T" in FIG. 6, represent trusted intermediate points, or nodes, within the supply chain, and circles, such as circle 602, labeled "C" in FIG. 6, represent untrusted nodes, such as counterfeiters in the pharmaceutical-supply-chain context. When the source point ships a shipment to the destination point 606, the shipment follows a pathway comprising a series of individual point-to-point shipments, represented by lines, such as line 610, and trusted nodes, such as trusted node 608, that connect the source point 604 with the destination point 606. In FIG. 6, the path taken by the shipment passes from the source point 604 through intermediate nodes 608, 612, and 614 prior to arriving at the destination point 606. This path involves four different node-to-node deliveries and three intermediate nodes.

Often, the source point cannot exactly predict, or predetermine, the path through intermediate nodes to the destination point. FIG. 7 shows an alternate path from the source point 604 to the destination point 606 for the shipment described above, with respect to FIG. 6. In this case, the shipment passes through intermediate nodes 702, 612, 608, 704, and 614 before arriving at the destination point 306. In this case, there are five intermediate nodes and six node-to-node deliveries. Both the path shown in FIG. 6 and the path shown in FIG. 7 are valid paths, from the standpoint of the source point 6604 and the destination point 606, because the shipment passes only through trusted nodes.

FIG. 8 shows an invalid path for the shipment described above with reference to FIGS. 6 and 7. In FIG. 8, an untrusted node 802 has interposed itself within the node-to-node delivery between trusted node 608 and trusted node 612. In the pharmaceutical-supply-chain context, this untrusted node may represent a counterfeiter who substitutes counterfeit drugs for the drugs shipped from trusted node 608, so that trusted node 612 receives counterfeit drugs, rather than authentic drugs. The counterfeiter may impose itself in many different ways, including penetrating the security of either trusted node 608 or trusted node 612, or somehow intercepting and tampering with the node-to-node delivery.

Figure 9:
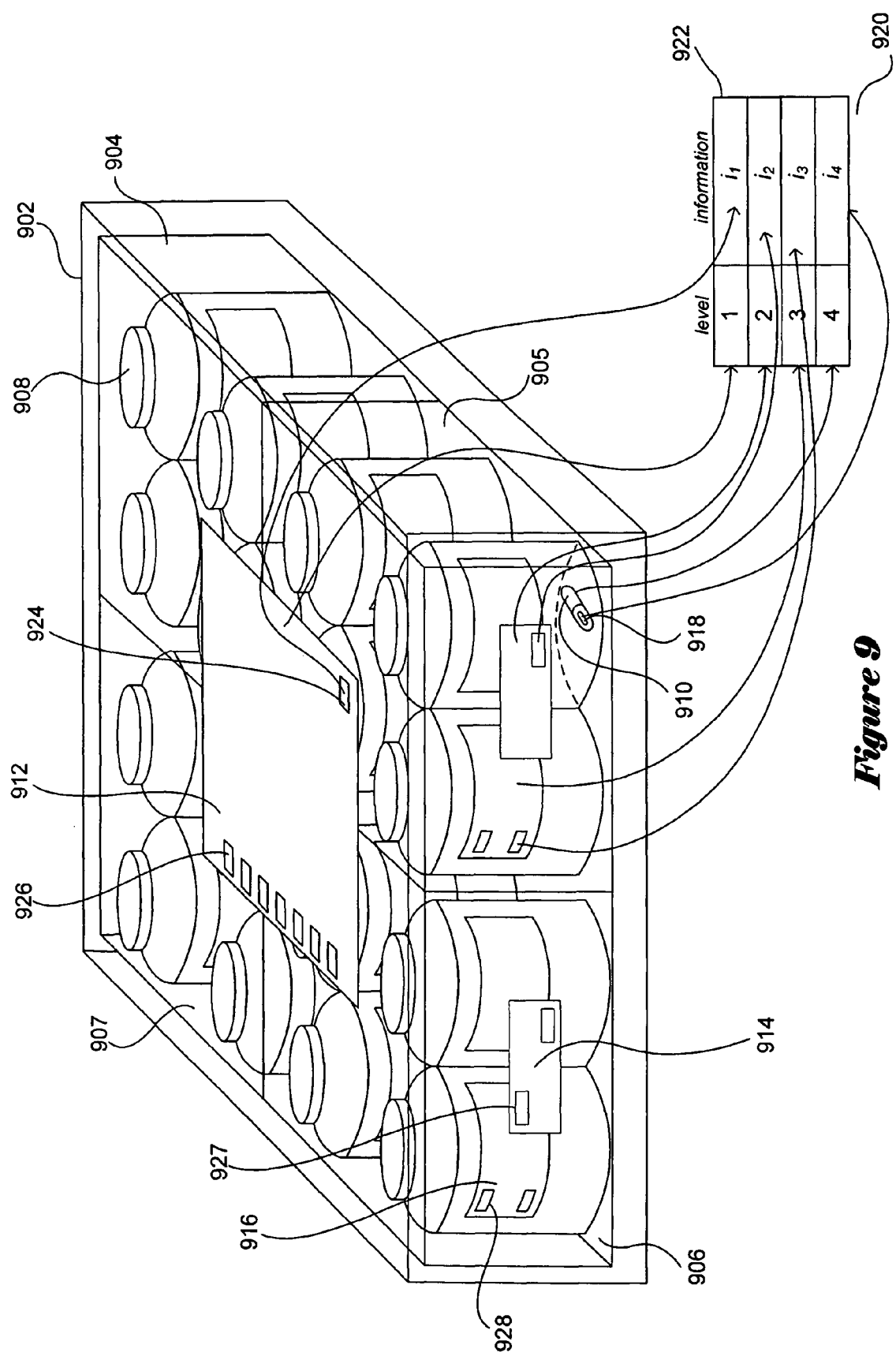
FIG. 9 illustrates hierarchical labeling of a shipment.

FIG. 9 illustrates hierarchical labeling of a shipment. The shipment shown in FIG. 9 includes an outer box 902 that encloses four inner boxes 904-907, each of which contains four large bottles of capsules, such as bottle 908, each bottle enclosing numerous drug capsules, such as drug capsule 910. There is an external label 912 affixed to the external box 902, labels, such as label 914, affixed to each of the four inner boxes 904-907 contained within the outer box 902, individual labels, such as label 916, on each bottle contained within each inner box, and a label, such as label 918, on each individual drug capsule, such as drug capsule 910. Thus, there are four different levels of labeling in the shipment. A source point, or security manager, may include numeric, textural, graphical, or other types of information on each label at each label level within the shipment. In FIG. 9, a single label-information value is included in packages or objects at each level. A label-information value may be a pseudo-random number printed on, encoded within, or otherwise incorporated within the packages or objects at a particular label level. This hierarchical label information can be expressed in a table, such as table 920, each row of which represents a level of labeling, and the numeric, textural, graphical, or other label information included in each package or object at the label level. In the table 920 shown in FIG. 9, the label-information values for levels 1-4 are represented by $i_1, i_2, i_3,$ and $i_4$.

The external label 912 represents the first level of labeling 922, and includes label information $i_1$ printed on, or encoded within, the label 924. The label information may be printed, electrically encoded, in an electronic label device, graphically encoded on the label, or incorporated within the label in many additional ways. Note that, the number of hierarchical label levels within a shipment may vary with different types of shipments and objects being shipped.

The external label 912 for the shipment shown in FIG. 9 also includes a number of additional pieces of encoded information, such as encoded information 926. These are referred to as label tags, and will be discussed in greater detail below. There may be one or more label tags incorporated within a shipment in different embodiments of the present invention. The label tags may be incorporated within an external label, such as external label 912 for the shipment shown in FIG. 9, or may be separately attached to the shipment, such as attached radio-frequency identifier tags, separately printed labels, or by other means, at one or more levels of packaging within the shipment, such as label tags 927 on an inner box label 914 and label tag 928 on a bottle label 916. It should be appreciated that a label may be a piece of printed paper, plastic, film, or composite material affixed to a package or object, but may also be information directly incorporated within, or embossed or imprinted on, an object being shipped or packaging enclosing the object. Generally, it is convenient for at least one of the label tags to be incorporated at the external level of packaging of a shipment.

Figure 10:
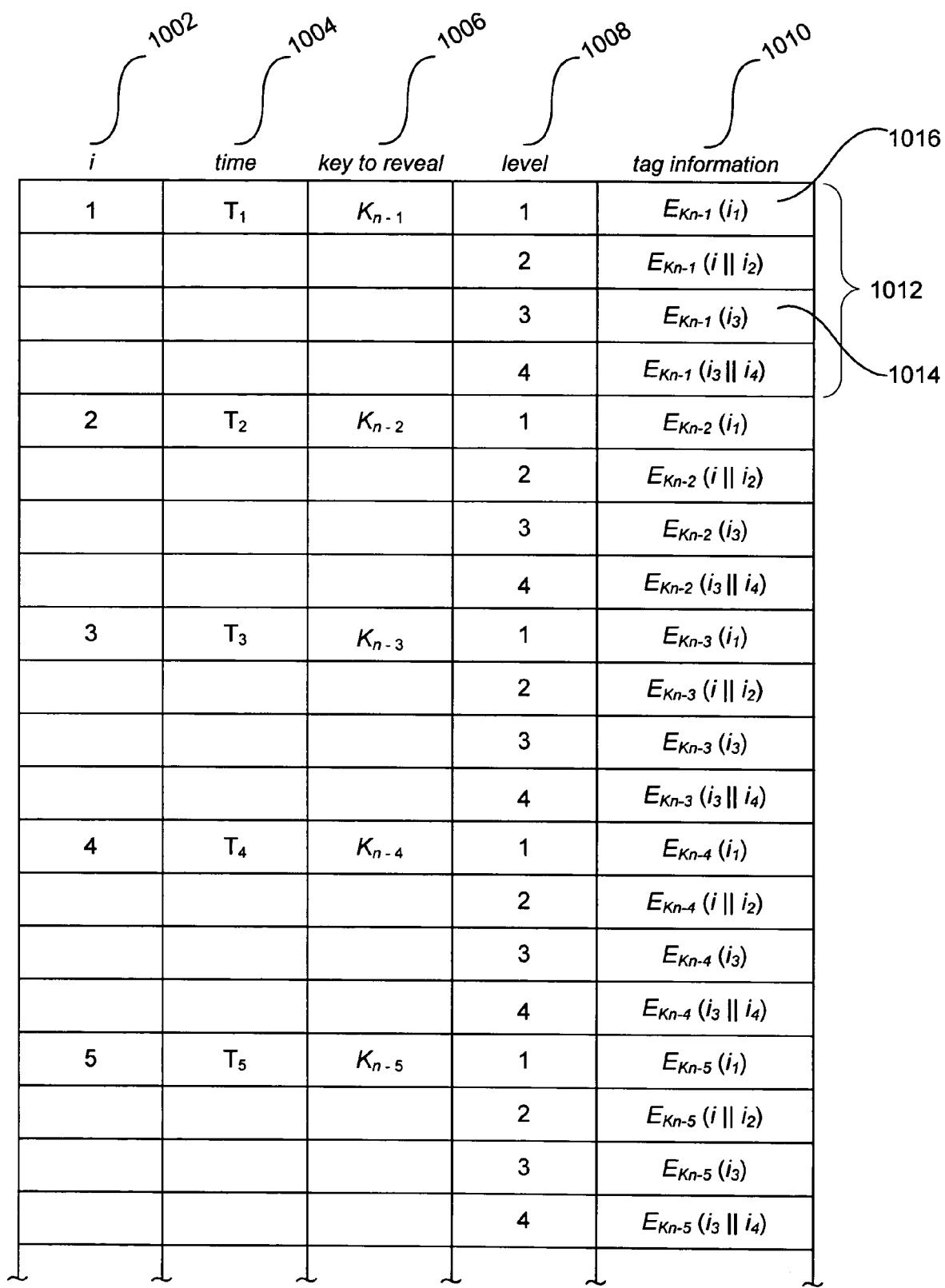
FIG. 10 is an example of a table that may be prepared by a source point, or shipment-security manager, in order to facilitate secure shipment of objects within a supply chain according to various embodiments of the present invention.

FIG. 10 is an example of a table that may be prepared by a source point, or shipment-security manager, in order to facilitate secure shipment of objects within a supply chain according to various embodiments of the present invention. In certain embodiments, a much smaller and less complex table may be used, while in other embodiments, the table may be significantly larger, and contain additional rows and columns. In alternative embodiments, the information may be electronically stored, or stored by other means in non-tabular form.

The table shown in FIG. 10 includes five columns: (1) a column 1002 containing indexes i that index units of encrypted information used as label tags stored within the table; (2) a time column 1004 containing particular points in time subsequent to the time that a shipment is shipped by the source point, each time associated with a different index; (3) a column of encryption keys 1006 that together form an encryption-key chain, such as the encryption-key chain illustrated in FIG. 5; (4) a labeling level column 1008 containing numeric label levels; and (5) a column of label-tag values 1010 that includes the label-tag values included in label tags that may be incorporated within a shipment. FIG. 10 shows a maximum amount of label-tag information that may be employed, according to one embodiment of the present invention, for a four-level shipment, such as the shipment shown in FIG. 9. However, not all of the label-tag information included in FIG. 10 need be used, depending on the security needs for the shipment and for the intermediate points and the destination point through which the shipment passes.

Each uniquely indexed set of four rows of the table shown in FIG. 10, such as the first four rows 1012, represents a unit of label-tag values that may be employed by intermediate points or the destination point for the shipment, beginning at the time associated with the unit of label-tag values, to authenticate a shipment. The label-tag values stored in column 1010 are encrypted label information that can be used to authenticate the shipment down to the labeling level associated in the table with the particular label-tag value. For example, label-tag value 1014 may be used to authenticate individual pills within the shipment shown in FIG. 9, at label-level four, while label-tag value 1016 may be used to authenticate the external level of packaging 902 of the shipment shown in FIG. 9, at label-level 1.

Each label-tag value is a label-information value, or multiple label-information values concatenated together, encrypted by an encryption function E using the encryption key associated with the unit of label-tag information that includes the label-tag value. For example, in order to generate label-tag value 1014, the label information contained within labels on individual bottles, such as label 916, and the labels on individual capsules, such as the label on capsule 910, are concatenated together and then encrypted using the encryption key $k_{n-1}$ associated with the unit of label-tag information 1012, mathematically represented as $E_{k_{n-1}}(i_3 \| i_4)$. In a described method embodiment of the present invention that uses the table shown in FIG. 10, a recipient of the shipment may authenticate the shipment down to any selected level by using the label tag corresponding to that selected level incorporated within the shipment, as well as the label information used to generate the label tag. It should be noted that the label-tag-information generation scheme described with reference to FIG. 10 is but one example of an almost limitless number of ways for generating an encrypted form of information hierarchically stored within a shipment.

Figure 11:
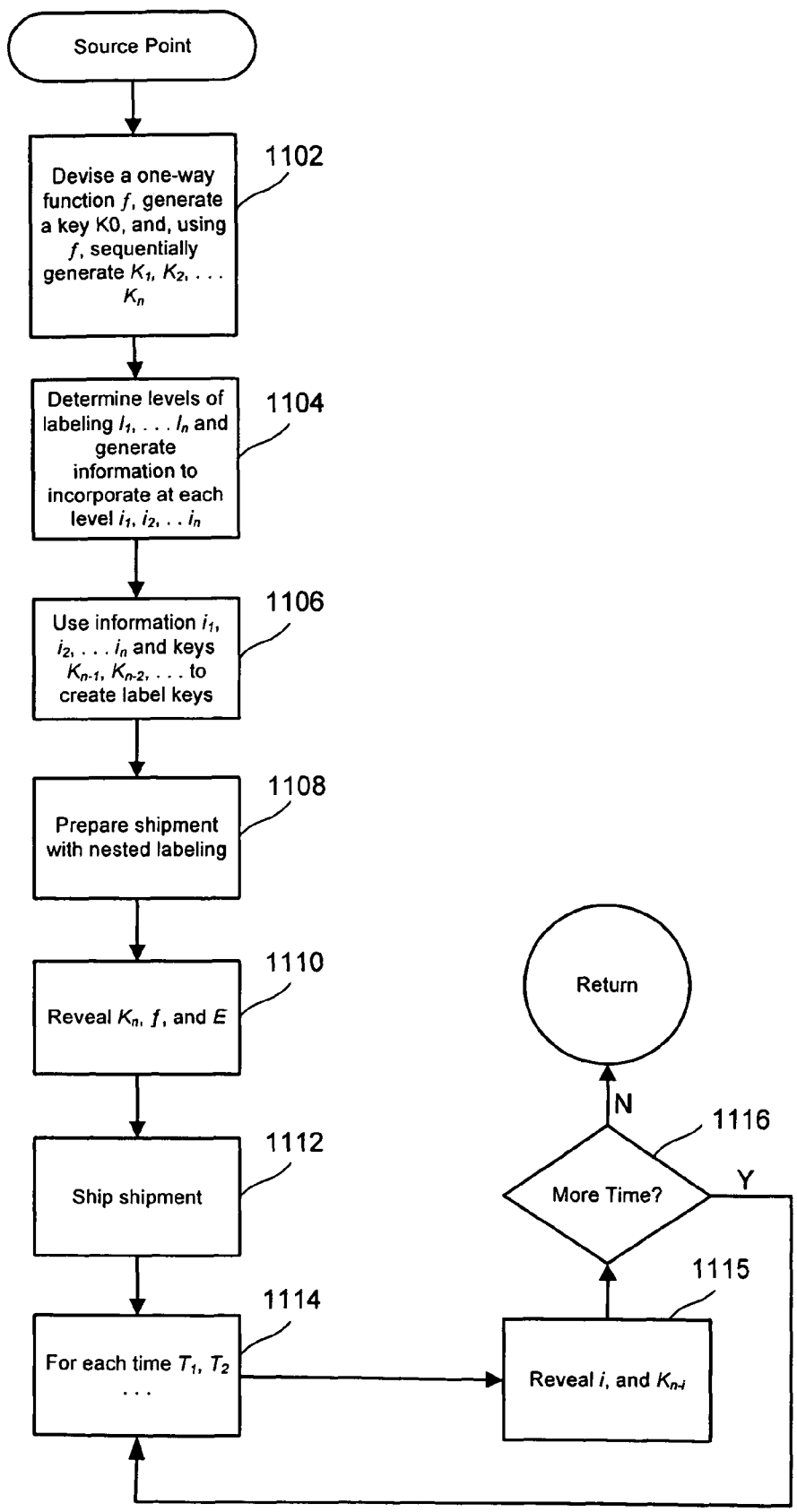
FIG. 11 is a control-flow-like diagram that describes one method embodiment of the present invention carried out by a source point or a security manager in order to secure shipment through a supply chain.

FIG. 11 is a control-flow-like diagram that describes one method embodiment of the present invention carried out by a source point or a security manager in order to secure shipment through a supply chain. First, in step 1102, the source point, or security manager, devises a one-way function f, such as the one-way function discussed above with reference to FIG. 4, and uses the one-way function to generate an encryption-key chain, such as the encryption-key chain discussed above with reference to FIG. 5. Then, in step 1104, the source point, or security manager, determines levels of labeling for the shipment, such as the levels of labeling discussed with reference to, and shown in, FIG. 9. The source point, or security manager, devises label information to incorporate in the shipment in each desired label level. In step 1106, the source point, or security manager, then generates label-tag values, such as the label-tag values shown in the table shown in FIG. 10. Label tags are incorporated into the shipment, in addition to the label information incorporated at each label level. As noted above, label tags may be label-tag values electronically stored within radio-frequency identifier tags, or other electronic devices, or numerically, texturally, or graphically printed within the shipment. Label-level-specific label tags are generally incorporated at appropriate levels in the packaging to allow for label-level-specific authentication. Next, in step 1108, the source point prepares a shipment, including labeling the shipment at each of the label levels with labels that include the generated label information as well as incorporating label tags within the shipment. In step 1110, the source point, or security manager, reveals the final encryption key $k_n$, the one-way function f, and the encryption function E to intermediate points and the destination point for the shipment. Step 1110 may precede any of the other steps in the control-flow diagram in various embodiments. Moreover, the same one-way function f and encryption function E may be repeatedly used for a series of shipments. Next, in step 1112, the source point ships the shipment into the supply chain. In the for-loop of steps 1114-1116, the source point, or security manager, monitors the passage of time, and when the time following shipment is equal to any of the predetermined times in column 1004 of FIG. 10, the source point or security manager reveals the index i and the encryption key $k_{n-i}$ to intermediate points and the destination point. In alternative embodiments, the index i may be inferred by supply-chain-point monitoring of the sequence of encryption keys revealed by the source point or security manager. If additional time points in the list of time points in column 1004 of the table shown in FIG. 10 remain, then the source point or security manager continues to monitor the passage of time in order to reveal a next index and encryption key at a next predetermined time following shipment. Once all of the pre-determined time intervals have passed, then the source point or security manager has finished.

Figure 12:
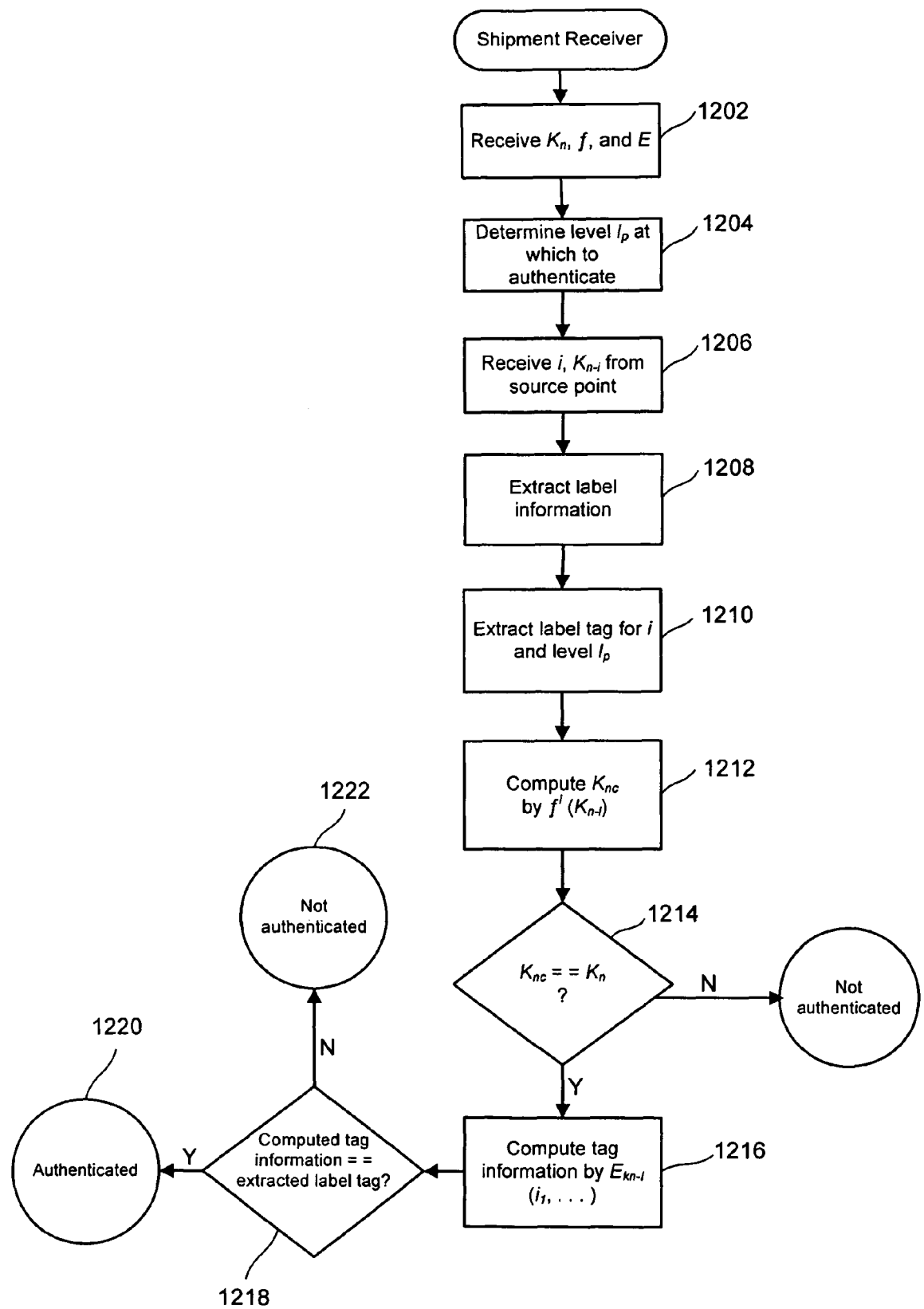
FIG. 12 is a control-flow-like diagram that illustrates the steps undertaken, according to one method embodiment of the present invention, by the current holder of a shipment in a supply chain to authorize the shipment to any particular labeling level.

FIG. 12 is a control-flow-like diagram that illustrates the steps undertaken, according to one method embodiment of the present invention, by the current holder of a shipment in a supply chain to authenticate the shipment to any particular labeling level. The holder of a shipment may be an intermediate point or may be the destination point in the supply chain. First, in step 1202, the holder of the shipment, or receiver of the shipment, receives the final encryption key in the encryption key-chain $k_n$, the one-way function f, and the encryption function E. As discussed above, the one-way function f and encryption function E may be repeatedly used for a series of shipments, and may be received separately from the final encryption key $k_n$. Next, in step 1204, the shipment's receiver determines a level of labeling at which to authenticate. For example, an intermediate point, such as a centralized distribution center in the pharmaceutical-supply-chain context, may elect to authenticate only at the external package level, if the centralized distributor does not intend to unpackage the shipment in order to distribute smaller portions of the shipment, enclosed in the external packaging. On the other hand, a regional distributor that intends to unpackage the external packaging in order to separately ship internal boxes may elect, in the example shown in FIG. 9, to authenticate at the internal-box level, or level 2. The final recipient of a bottle of capsules, such as a retail drug outlet, may wish to authenticate at level 4. In step 1206, the shipment receiver receives the most recent index i and encryption-key $k_{n-i}$ from the source point or security manager. In alternative embodiments, the index i may be inferred from monitoring the sequence of encryption keys revealed. In step 1208, the shipment receiver extracts the label information incorporated within labels of the packaging and objects being shipped for the level at which authentication is taken, determined in step 1204. In step 1210, the shipment receiver extracts the appropriate label tag for the index i and the chosen level of authentication from the shipment. In step 1212, the shipment receiver uses the received index i and encryption key $k_{n-i}$ to compute a computed final encryption key $k_{n_c}$ by applying the one-way function f to the received encryption key $k_{n-i}$ i times, represented mathematically as $f^i(k_{n-i})$. If the computed final encryption key $k_{n_c}$ is equal to the received final encryption key $k_n$, as determined in step 1214, then the shipment receiver is confident that the received encryption key is valid. In that case, authentication continues in step 1216, in which the shipment receiver computes the label-tag value corresponding to the index i and label level for authentication information by applying the encryption function E to the label information extracted from the shipment. Then, in step 1218, the shipment receiver determines whether the computed label-tag value is equal to the extracted label tag. If so, the shipment is authenticated 1220, and if not, the shipment is not authenticated 1222.

In simpler embodiments, the shipment authentication process may be only carried out at the lowest label level, by the destination point, obviating the need for more than one label tag. As discussed above, label tags appropriate for each desired level of authentication at each of the pre-determined times needs to be incorporated at the appropriate level to the packaging. For example, if the shipment shown in FIG. 9 were intended to be shipped, as is, all the way to the destination point, then the label tags may all be incorporated within, or affixed to, the external level of packaging. However, if the external level of packaging, and even intermediate levels of packing, are removed and discarded along the supply chain, then the label tags would need to be incorporated at the appropriate, surviving packaging levels or physical objects to allow for authentication at the destination point. As discussed above, a label tag needs to incorporate only label information that is available to intermediate points and destination points at the pre-determined times. Thus, for example, if the outer two layers of packaging are expected to be removed before bottles of capsules are delivered to a retail outlet, then the label tag for the bottles needs to use label information available on the bottle and/or on individual capsules.

The method of shipment authentication using an encryption-key chain, label information, and label tags can be used by the source point or security manager to control the time-sequence of individual, point-to-point shipments within the supply chain, since an intermediate point or destination point cannot authenticate the shipment prior to the time associated with the encryption key furnished to the intermediate point or destination point. The source point or security manager needs only reveal time-associated encryption keys to specific intermediate points in order to control the time-sequence of individual, point-to-point shipments. Counterfeiters cannot use previously revealed encryption keys to defeat subsequent authentication, because of the properties of the encryption-key chain and one-way functions. Therefore, any tampering of a shipment that results in a change of label information at label levels subsequently used for authentication is detected by a downstream intermediate point or destination point.

A different key chain and different label information values are generally used for each different shipment, to prevent counterfeiters from assembling a key chain and corresponding label information in order to defeat authentication in a future shipment. Label information may be altered by appending random bits to previously used label information. One-way functions may be reused, since almost limitless different key chains can be generated from a single one-way function.

Although the present invention has been described in terms of particular embodiments, it is not intended that the invention be limited to these embodiments. Modifications within the spirit of the invention will be apparent to those skilled in the art. For example, any of an almost limitless number of different encryption key techniques and one-way functions can be employed to produce a series of encryption keys with the properties needed for the described embodiments of the present invention. Label information and label-tag information may be, as discussed above, encoded into electronic tags, printed numerically, texturally, or graphically onto labels, objects, or packaging, or incorporated within packaging or objects by any number of different possible methods. Level-specific authentication may be provided to any arbitrary depth of labeling. In alternative embodiments of the present invention, the source point or security manager may prepare labels and label tags and use them to label the shipment, or, alternatively, may prepare only information for the labels and label tags, and furnish the information to a separate labeling entity. Similarly, the source point or security manager may ship the shipment into a supply chain, or may furnish the shipment to a shipper for shipping, or a labeling entity may also ship the shipment, or furnish the shipment to a shipper for shipment. In yet alternative embodiments, the source point or security manager may obtain the labeling information and label tags from a third-party secure shipment service.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for authenticating a shipment, the method comprising:
   devising a one-way function, and using the one-way function to generate an encryption-key chain;
   determining a sequence of predetermined times;
   preparing label information for one or more labels to be included at corresponding label levels within the shipment; and
   using keys of the encryption-key chain to encrypt label information to produce label-tag information for one or more label tags, each label tag and encryption key used to generate a label tag associated with a different predetermined time; and subsequently at each of the predetermined times, revealing the encryption key associated with the predetermined time.

2. The method of claim 1 further including:

preparing one or more labels using the label information and one or more label tags using the label-tag information; and labeling the shipment with one or more labels and one or more label tags at corresponding label levels within the shipment.

3. The method of claim 2 wherein preparing one or more labels using the label information further includes, for each label level, incorporating numeric, text-based, graphically encoded, or electronically encoded label information within the corresponding label level.

4. The method of claim 2 wherein preparing one or more label tags using the label-tag information further includes, for each label level, printing the label-tag information as a numeric, text-based, or graphically encoded value or electronically encoding the label tag in an electronic device affixed to the shipment at a corresponding label level.

5. The method of claim 1 further including shipping the shipment into a supply chain.

6. The method of claim 1 further including:

receiving the shipment from the supply chain;

obtaining an encryption key associated with a most recent predetermined time;

extracting label information from the shipment;

extracting a label tag from the shipment;

using the obtained encryption key to encrypt the extracted label information in order to generate a computed label tag; and comparing the computed label tag with the extracted label tag to determine whether or not the shipment is authentic.

7. The method of claim 6 further including:

revealing a final encryption key in the encryption-key chain; and revealing a numeric index with each subsequently revealed encryption key.

8. The method of claim 7 further including, upon receiving the shipment from the supply chain:

employing the one-way function a number of times indicated by the index to compute the final encryption key from a subsequently revealed encryption key; and comparing the computed final encryption key to the revealed final encryption key to determine whether or not the subsequently revealed encryption key is authentic.

9. A method for authenticating a shipment shipped through a supply chain, the method comprising:

devising a one-way function, and using the one-way function to generate an encryption-key chain;

determining a sequence of predetermined times;

incorporating label information at one or more label levels within the shipment;

using keys of the encryption-key chain to encrypt label information to produce one or more label tags, each label tag and encryption key used to generate the label tag associated with a different predetermined time;

labeling the shipment with the label information and incorporating into the shipment one or more label tags;

shipping the shipment into the supply chain;

at each of the predetermined times, revealing the encryption key associated with the predetermined time;

receiving the shipment from the supply chain;

obtaining an encryption key associated with a most recent predetermined time;

extracting label information from the shipment;

extracting a label tag from the shipment;

using the obtained encryption key to encrypt the extracted label information in order to generate a computed label tag; and comparing the computed label tag with the extracted label tag to determine whether or not the shipment is authentic.

10. The method of claim 9 further including:

revealing a final encryption key in the encryption-key chain; and revealing a numeric index with each subsequently revealed encryption key.

11. The method of claim 9 further including, upon receiving the shipment from the supply chain:

employing the one-way function a number of times indicated by the index to compute the final encryption key from a subsequently revealed encryption key; and comparing the computed final encryption key to the revealed final encryption key to determine whether or not the subsequently revealed encryption key is authentic.

12. The method of claim 9 wherein incorporating label information at one or more label levels within the shipment further includes, for each label level, incorporating numeric, text-based, graphically encoded, or electronically encoded label information within the shipment at the label level.

13. The method of claim 9 wherein each label tag is incorporated at a selected label level within the shipment by printing the label tag as a numeric, text-based, or graphically encoded value or electronically encoding the label tag in an electronic device affixed to the shipment at a selected label level.

* * * * *